Dec. 25, 1934.　　　　J. A. ROCHÉ　　　　1,985,262
METHOD AND MEANS FOR CONSTRUCTING AIRCRAFT STRUCTURES
Filed Nov. 14, 1930　　　2 Sheets-Sheet 1

INVENTOR
Jean A. Roché

INVENTOR
Jean A. Roché

Patented Dec. 25, 1934

1,985,262

UNITED STATES PATENT OFFICE 1,985,262

METHOD AND MEANS FOR CONSTRUCTING AIRCRAFT STRUCTURES

Jean Alfred Roché, Dayton, Ohio

Application November 14, 1930, Serial No. 495,650

3 Claims. (Cl. 244—31)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in the method and construction or fabrication of aircraft structures and more particularly to the assembly of structures having a surfacing material, such as fabric, connected thereto as for example the airfoils of an airplane including the wings, elevators, control surfaces, and the like.

While I am about to describe my invention as applied to the attachment of fabric to the wing ribs of an airplane, it will be quite evident that my invention can readily be applied in the composite construction of other parts of the airplane, such for example in attaching the fabric to the fairing strip of the fuselage or to the structure of tail surfaces of the airplane. In fact, it will be expressly understood that this election is merely for illustrative purposes and shall not be construed as a limitation of the scope of the invention except as claimed.

In the construction or fabrication of airplane wings of many types, a frame work of metal is covered with a treated fabric, which forms the skin or exposed surfaces of the wing. This covering material, in accordance with the common present practice, is tied or laced to the frame members by a method of sewing which usually comprises passing the lacing strand through the fabric and around the top and bottom edges of the frame members, the lacing being tied or knotted at each point of connection with the frame members or at such other points as may be desirable or necessary. It is found that, with this method of affixing the fabric to the frame work, the lacing strand is not sufficiently resistant to withstand the cutting effect of the edges of the framework; that only a few threads of the fabric covering are caught, which obviously does not result in a strong attachment, unless a great number of stitches are made; that when long stitches must be used, the strands will stretch and shrink with changes of relative humidity of the atmosphere and that the cost of production is materially increased by reason of the fact that this method is slow and laborious and requires two operatives where large areas are being covered.

It is the primary object of my invention to provide a novel method and means of attaching fabric covering material to frame members whereby a more rapid assembly of the framework and covering is effected than was heretofore possible and at the same time avoid the disadvantages of the present methods as heretofore pointed out.

It is a further object of my invention to provide a novel type of fastening means which will not only serve for attaching the fabric covering to the frame but also as a reinforcement to prevent rupture or breakage of the fabric when secured.

Another object of my invention is to relieve the chord members in truss type ribs of concentrated beam loads by locating the staple attachments substantially at the points of intersection of the truss members.

My invention further contemplates the use of a beam or rod, which when disposed longitudinally on the fabric covering at the point of connection with the frame work and fabric supporting surface, will cooperate with the fastening means to additionally reinforce the fabric against rupture or breakage.

Other and further objects and advantages of my invention will be apparent from the description hereinbelow.

In order that the invention may be clearly understood and readily carried into effect the same will now be more fully described with the aid of the accompanying drawings, in which.

Figure 5:
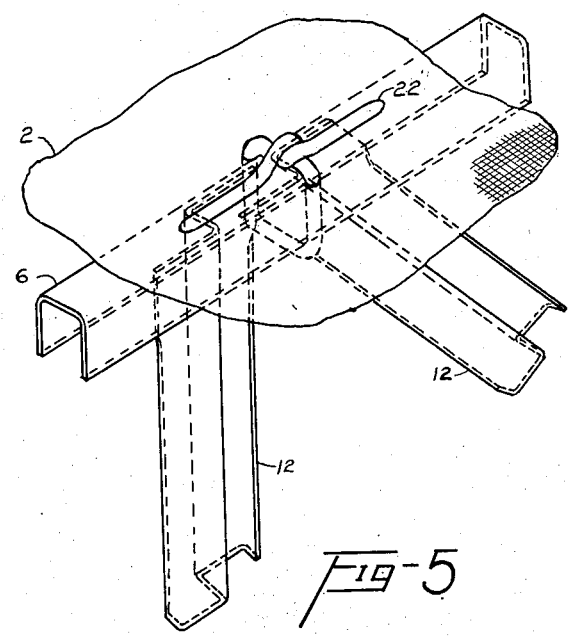
Fig. 5 is a modification of my invention.
Figure 1:
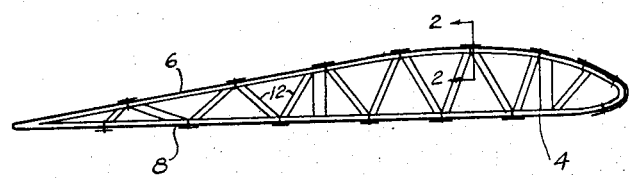
Fig. 1 is a side elevational view showing a conventional rib, that is employed in the fabrication of the framework on an airplane wing and the fabric covering attached thereto in accordance with my invention.

Referring now to the drawings in detail, like numerals represent like parts in detail. The numeral 2 designates the covering or surfacing fabric material and 4 the ribs of the wing structure. Each rib 4 is of a conventional metal construction and consists of upper and lower girders 6 and 8 respectively, braced by means of trusses 12. The upper and lower girders constitute the supporting means for the fabric covering and although shown as channel shaped they might be round, rectangular or of any section efficient as a beam and column.

Figure 2:
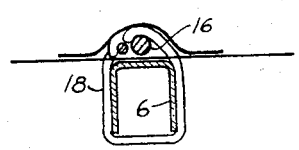
Fig. 2 is a sectional view taken on the line 2—2 of Fig. 1.
Figure 3:
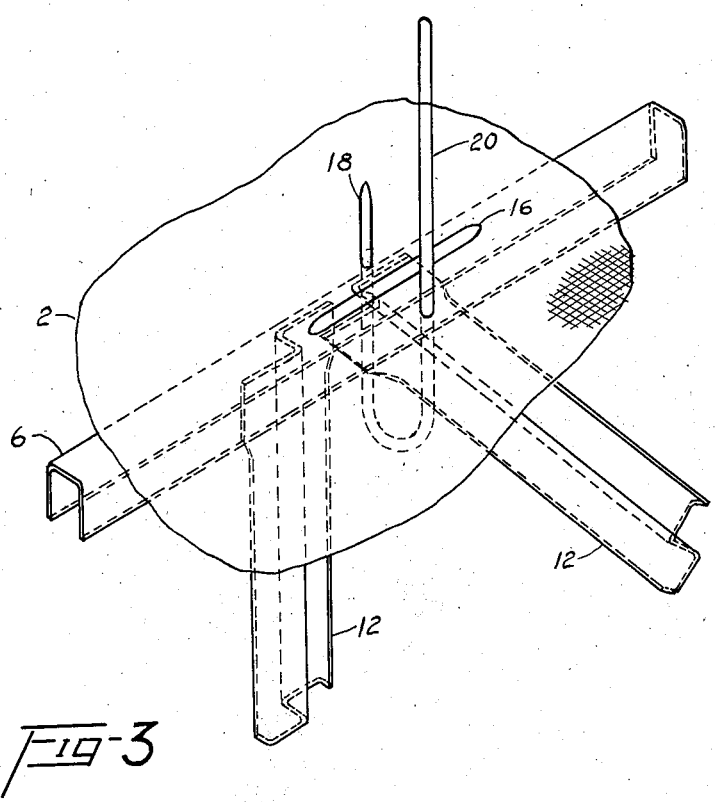
Fig. 3 is a fragmentary view of the rib and covering in perspective, illustrating the manner in which the fastening means is disposed with respect to the framework and covering prior to tying the parts together.
Figure 4:
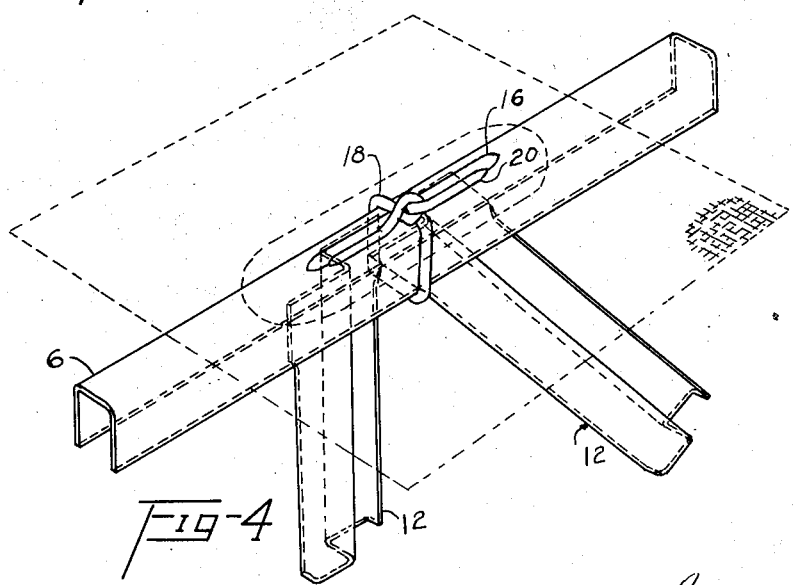
Fig. 4 is a view similar to Fig. 3 showing the fabric covering in phantom as attached to the rib and reinforced on opposite sides of the point of connection, a tape or strip patch in phantom being laid over the exposed attaching and reinforcing means to give a finished effect and to prevent accidental displacement of the reinforcing beam.

The covering is attached at spaced intervals along the upper and lower girders of the wing rib and, as shown in Figs. 2, 3 and 4, the attaching means consists of a metallic staple 14 and a metallic rod or beam 16. The staple is formed with legs of unequal length to permit the insertion thereof, from the exterior of the wing, in such manner that the legs of the staple straddle the girder and extend outwardly of the wing and the bight portion of the staple is disposed interiorly of the wing and in contact with the inner flange edges of the girder. Prior to twisting and tying the staple for affixing the fabric in the framework, the rod 16 is placed intermediate of the staple legs, 18 and 20 on the outer surfacing and is disposed longitudinally of the fabric supporting surface with its mid portion lying in the plane of said legs. In affixing the fabric covering in this manner, it will be apparent that the rod 16 will carry in bending the load imparted to it by the fabric and the staple in turn will carry the load from the rod to the rib structure. The bending resistance of the rod not being as great as the tensile strength of the staple it will be necessary that the gage of the rod be somewhat greater than that of the staple.

Fig. 5 shows a further embodiment of my invention. In this illustration the staple 22 attaches the fabric to the framework in substantially the same manner as above described. The staple, however, is made of a relatively stronger gage wire and thus when the legs are bent down against the fabric after being twisted and tied, these bent portions constitute the beams which serve as the reinforcing means for the fabric.

The material used in the rod and staples described above may be of steel, spring brass or aluminum alloy. The latter is probably the most suitable because of its greater specific resistance to bending. The gage to be used and the degree of ductility necessary in the staple material can best be determined by practical tests. In certain cases a wooden peg might be substituted for the metal beam.

Following the lacing or tying of the covering to the frame, strips of tape or small patches may be laid over the exposed parts of the fastener, and cemented to the fabric with dope as usual, thereby adding materially to the finished appearance of the wing and the security of the connection between the frame and the covering.

While I have shown my invention as applied to a conventional type of wing framework, it will be obvious to those skilled in the art that where the ribs are made from sheet metal or where special shapes or constructions are employed, openings immediately below or above the fabric supporting surfaces of the upper and lower chords respectively may be provided through which the wire staples may be inserted and that two or more staples may be used where the fabric loads are relatively greater.

From the foregoing it will be seen that I have provided a novel method and means of attaching and reinforcing a fabric covering to a framework, which is simple, economical and highly efficient.

What I claim is new and desire to secure by Letters Patent is:

1. A means of attaching the covering surface to a frame element in airplane wing construction comprising a staple having its legs disposed about a portion of said covering surface and said frame element and jointed together at their intermediate portions to form a loop and having their end portions oppositely disposed longitudinally of said frame element for reinforcing said covering surface and further reinforcing means parallelly disposed relative to said end portions intermediate of said covering surface and said loop.

2. A means of attaching the covering surface of an aircraft to a frame element thereof comprising in combination a metallic staple having its body portion disposed interiorly of said covering and its legs jointed together exterior of the covering to form a loop about a portion of said covering and about said frame element, said legs having their end portions disposed longitudinally of said element and contacting with said covering substantially as and for the purpose described.

3. A means of attaching the covering surface to a frame element in airplane wing construction comprising a staple having its legs disposed about a portion of said covering surface and said frame element and jointed together at their intermediate portions to form a loop and having portions laterally disposed with respect to the plane of said staple for reinforcing said covering surface.

JEAN A. ROCHÉ.